United States Patent
Kim et al.

(10) Patent No.: US 12,269,471 B2
(45) Date of Patent: Apr. 8, 2025

(54) ACCELERATION LIMIT CONTROL APPARATUS AND METHOD

(71) Applicants: Hyundai Motor Company, Seoul (KR); Kia Corporation, Seoul (KR)

(72) Inventors: Do Hwa Kim, Gwacheon-si (KR); Hui Un Son, Suwon-si (KR); Sung Il Jung, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 226 days.

(21) Appl. No.: 18/051,649

(22) Filed: Nov. 1, 2022

(65) Prior Publication Data
US 2023/0256966 A1    Aug. 17, 2023

(30) Foreign Application Priority Data
Feb. 16, 2022 (KR) .................... 10-2022-0020184

(51) Int. Cl.
    *B60W 30/14*    (2006.01)
    *B60W 40/09*    (2012.01)
    *B60W 50/00*    (2006.01)
    *B60W 50/08*    (2020.01)
    *B60W 50/14*    (2020.01)

(52) U.S. Cl.
    CPC .......... *B60W 30/143* (2013.01); *B60W 40/09* (2013.01); *B60W 50/085* (2013.01); *B60W 50/14* (2013.01); B60W 2050/0083 (2013.01); B60W 2050/143 (2013.01); B60W 2050/146 (2013.01); B60W 2540/106 (2013.01); B60W 2540/12 (2013.01); B60W 2540/18 (2013.01); B60W 2540/22 (2013.01);
    (Continued)

(58) Field of Classification Search
None
See application file for complete search history.

(56) References Cited

U.S. PATENT DOCUMENTS 11,040,619 B1 *   6/2021   Martin ................ G06T 7/593
2010/0262348 A1 * 10/2010  Nallapa ............. B60W 50/085
                                                        701/84
(Continued)

FOREIGN PATENT DOCUMENTS

CN       110871809 A     3/2020
KR    10-2015-0089483 A  8/2015
(Continued)

OTHER PUBLICATIONS

Merged Foreign Patent and PE2E English Translation of KR 102270731 B1 (Year: 2021).*

Primary Examiner — James J Lee
Assistant Examiner — Andrew Sang Kim
(74) Attorney, Agent, or Firm — Banner & Witcoff, Ltd.

(57) ABSTRACT

An apparatus may be configured to determine whether to adjust an acceleration limit level associated with an acceleration limit operation for a corresponding vehicle speed range. The adjustment may be performed by using driver information acquired based on biometric information of a driver. The apparatus may be configured to control an adjustment of the acceleration limit level. The apparatus may be configured to change a limit acceleration of the vehicle that is accelerated based on a degree of accelerator pedal manipulation by the driver and the adjusted acceleration limit level.

17 Claims, 4 Drawing Sheets

(52) U.S. Cl.
CPC ... *B60W 2540/221* (2020.02); *B60W 2540/30* (2013.01); *B60W 2556/10* (2020.02)

(56) References Cited

U.S. PATENT DOCUMENTS

| | | | |
|---|---|---|---|
| 2012/0212353 A1* | 8/2012 | Fung | G08G 1/167 701/1 |
| 2014/0372003 A1 | 12/2014 | Ly | |
| 2019/0367029 A1 | 12/2019 | Martinez Ruvalcaba et al. | |
| 2020/0094851 A1* | 3/2020 | Smye-Rumsby | B60W 50/14 |

FOREIGN PATENT DOCUMENTS

| | | |
|---|---|---|
| KR | 10-2017-0128106 A | 11/2017 |
| KR | 101907662 B1 | 12/2018 |
| KR | 10-2020-0135630 A | 12/2020 |
| KR | 10-2021-0077858 A | 6/2021 |

\* cited by examiner

ACCELERATION LIMIT CONTROL APPARATUS AND METHOD

CROSS-REFERENCE TO RELATED APPLICATION

This application claims the benefit of Korean Patent Application No. 10-2022-0020184, filed on Feb. 16, 2022, which is hereby incorporated by reference as if fully set forth herein.

BACKGROUND

Field

The present disclosure relates to an acceleration limit control apparatus and method.

Discussion of the Background

A speed limit assist (SLA) device may be one of driving safety systems that can be equipped in vehicles and may limit vehicle speed so as not to exceed a speed limit set by a driver.

Also, a function of performing control such that acceleration of a vehicle does not exceed a configured level of acceleration limit may be implemented in the vehicle even though a driver depresses an accelerator pedal during driving of the vehicle, thereby providing gradual acceleration.

In order to provide gradual acceleration, an accelerator position sensor (APS) value adjustment may be performed to adjust an APS value, thereby weakening the degree of acceleration according to a predetermined acceleration limit level even when the accelerator pedal is strongly depressed.

When the APS scale adjustment is performed, however, the acceleration of the vehicle in response to the driver's manipulation of the accelerator pedal may be delayed. In particular, while driving on an upward ramp, acceleration performance may be greatly deteriorated, and therefore expected acceleration performance may not be achieved.

In another example, the driver may not be satisfied with the acceleration performance by one or more discomforting events (e.g., another vehicle cuts in ahead of a host vehicle during driving in the state in which an acceleration limit function is enabled). When the driver is distracted by the one or more discomforting events, the driver may rapidly accelerate the vehicle (e.g., in order to chase another vehicle).

If the driver rapidly accelerates the vehicle (e.g., due to one or more discomforting events), however, safety of a passenger as well as the driver may be at a higher risk.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

The present disclosure is directed to an acceleration limit control apparatus and method that substantially obviate one or more problems of acceleration limit control operations. To address the one or more problems, an apparatus may determine whether an acceleration limit needs to be changed (e.g., lowering or raising the acceleration limit) based on biometric information of a driver and an acceleration limit level may be automatically adjusted according to the result of determination.

The present disclosure provides an acceleration limit control apparatus and method capable of determining whether acceleration limit is adjusted based on biometric information of a driver and automatically adjust an acceleration limit level according to the result of determination.

An apparatus may comprise: at least one processor; and memory storing instructions that, when executed by the at least one processor, cause the apparatus to: determine, based on biometric information of a driver of a vehicle, whether to adjust an acceleration limit level associated with an acceleration limit control operation of the vehicle; adjust the acceleration limit level; and control, based on a degree of an accelerator pedal manipulation and the adjusted acceleration limit level, an acceleration of the vehicle.

The instructions, when executed by the at least one processor, may cause the apparatus to determine whether to adjust the acceleration limit level by: receiving the biometric information of the driver from a biometric sensor; determining, based on the biometric information, driver information of the driver; comparing a value associated with the driver information with a threshold value for a corresponding vehicle speed range; and determining, based on the value associated with the driver information exceeding the threshold value, to adjust the acceleration limit level. The instructions, when executed by the at least one processor, may cause the apparatus to adjust the acceleration limit level based on the value associated with the driver information exceeding the threshold value at least for a time duration.

The instructions, when executed by the at least one processor, may cause the apparatus to: receive, from a biometric sensor as the biometric information, a heart rate of the driver and a stress index of the driver; receive, from one or more sensors associated with the vehicle, information indicating changes in the degree of the accelerator pedal manipulation, a degree of a brake pedal manipulation, and a steering angle; and determine, based on the information indicating changes in the degree of the accelerator pedal manipulation, the degree of the brake pedal manipulation, and the steering angle, driving tendency information of the driver.

The instructions, when executed by the at least one processor, may cause the apparatus to: set a plurality of vehicle speed ranges; stores, for a corresponding vehicle speed range, the biometric information and the driving tendency information; and set a threshold value for each of the plurality of vehicle speed ranges.

The instructions, when executed by the at least one processor, may cause the apparatus to: update the driver information based on a difference between a measured value acquired while the vehicle is moving and a previously measured value of the driver information.

The instructions, when executed by the at least one processor, may cause the apparatus to determine whether to adjust the acceleration limit level further based on: a change in the biometric information of the driver that exceeds a threshold value; and a driving event caused by an external intervention.

The instructions, when executed by the at least one processor, may cause the apparatus to generate a control signal for increasing or decreasing the acceleration limit level.

The instructions, when executed by the at least one processor, may cause the apparatus to: maintain the adjusted acceleration limit level for a time duration; and after maintaining the adjusted acceleration limit level, readjust the adjusted acceleration limit level to a previous acceleration limit level.

The instructions, when executed by the at least one processor, may cause the apparatus to: control the acceleration of the vehicle further based on a value associated with the driver information exceeding a threshold value; and readjust, based on the value associated with the driver information not exceeding the threshold value, the adjusted acceleration limit level to a previous acceleration limit level.

The instructions, when executed by the at least one processor, may cause the apparatus to output, using an output device of the vehicle, a notification indicating that the acceleration limit level has been adjusted.

A method may comprise: storing, by an apparatus of a vehicle, driver information recognized based on biometric information, of a driver of the vehicle, acquired from a biometric sensor; comparing a value associated with the driver information with a threshold value associated with the driver information for a corresponding vehicle speed range; adjusting, based on the value associated with the driver information exceeding the threshold value for a time duration, an acceleration limit level; and controlling, based on the adjusted acceleration limit level, an acceleration of the vehicle.

The method may further comprise: storing, as driving tendency information for the corresponding vehicle speed range, information indicating changes in a degree of an accelerator pedal manipulation by the driver, a degree of a brake pedal manipulation by the driver, and a steering angle, wherein the information indicating the changes is received from one or more sensors associated with the vehicle; storing, as biometric information for the corresponding vehicle speed range, a heart rate of the driver and a stress index of the driver that are received from the biometric sensor; and setting, using the biometric information for the corresponding vehicle speed range and the driving tendency information for the corresponding vehicle speed range, one or more threshold values for the corresponding vehicle speed range.

The method may further comprise: updating the driver information based on a difference between a measured value acquired while the vehicle is moving and a previously measured value of the driver information.

The method may further comprise: determining whether to adjust the acceleration limit level based on: a change in the biometric information; and a driving event caused by an external intervention.

The method may further comprise: generating a control signal for increasing or decreasing the acceleration limit level; and transmitting the control signal for calculating a limit acceleration.

The method may further comprise: maintaining the adjusted acceleration limit level for a second time duration; and after maintaining the adjusted acceleration limit level, readjusting the adjusted acceleration limit level to a previous acceleration limit level.

The method may further comprise: outputting, using an output device of the vehicle, a notification indicating that the acceleration limit level has been adjusted.

These and other features and advantages are described in greater detail below.

BRIEF DESCRIPTION OF THE DRAWINGS

The accompanying drawings, which are included to provide a further understanding of the disclosure and are incorporated in and constitute a part of this application, illustrate various examples of the disclosure. In the drawings.

DETAILED DESCRIPTION

Description will now be given in detail with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the examples presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. A singular representation may include a plural representation unless it represents a definitely different meaning from the context.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

In addition, "unit" or "control unit" included in names, such as a motor control unit and a hybrid control unit, is a term that is widely used to name a controller that controls a specific function of a vehicle, but does not mean a generic functional unit. For example, each control unit may include a communication device that communicates with another control unit or a sensor in order to control an assigned function, a memory that stores an operating system, logic commands, and input and output information, and at least one processor that performs determination, calculation, and decision necessary to control the assigned function.

Hereinafter, various examples of the present disclosure will be described in detail with reference to the accompanying drawings.

Figure 1:
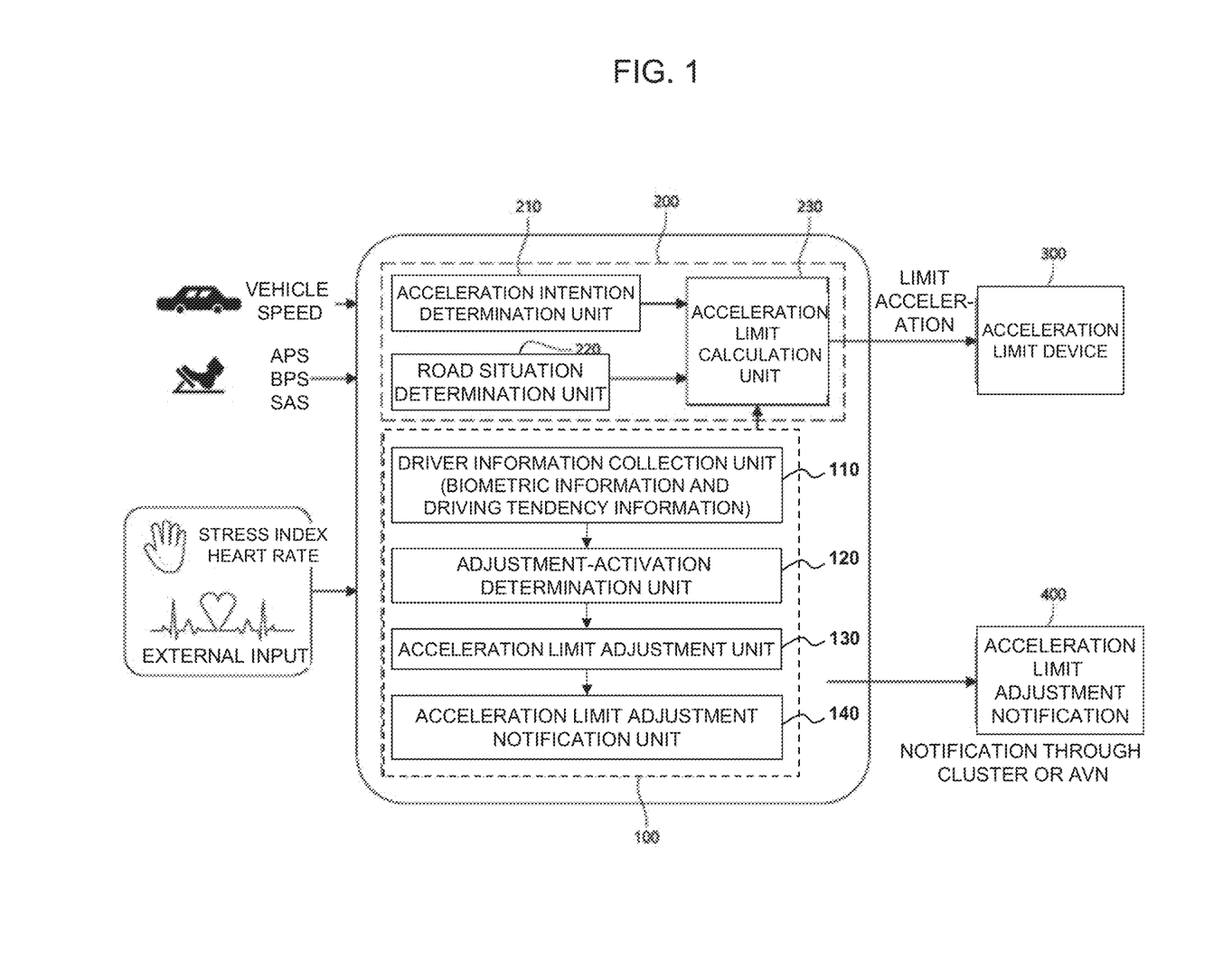
FIG. 1 is a diagram showing an acceleration limit control apparatus.
Figure 2:
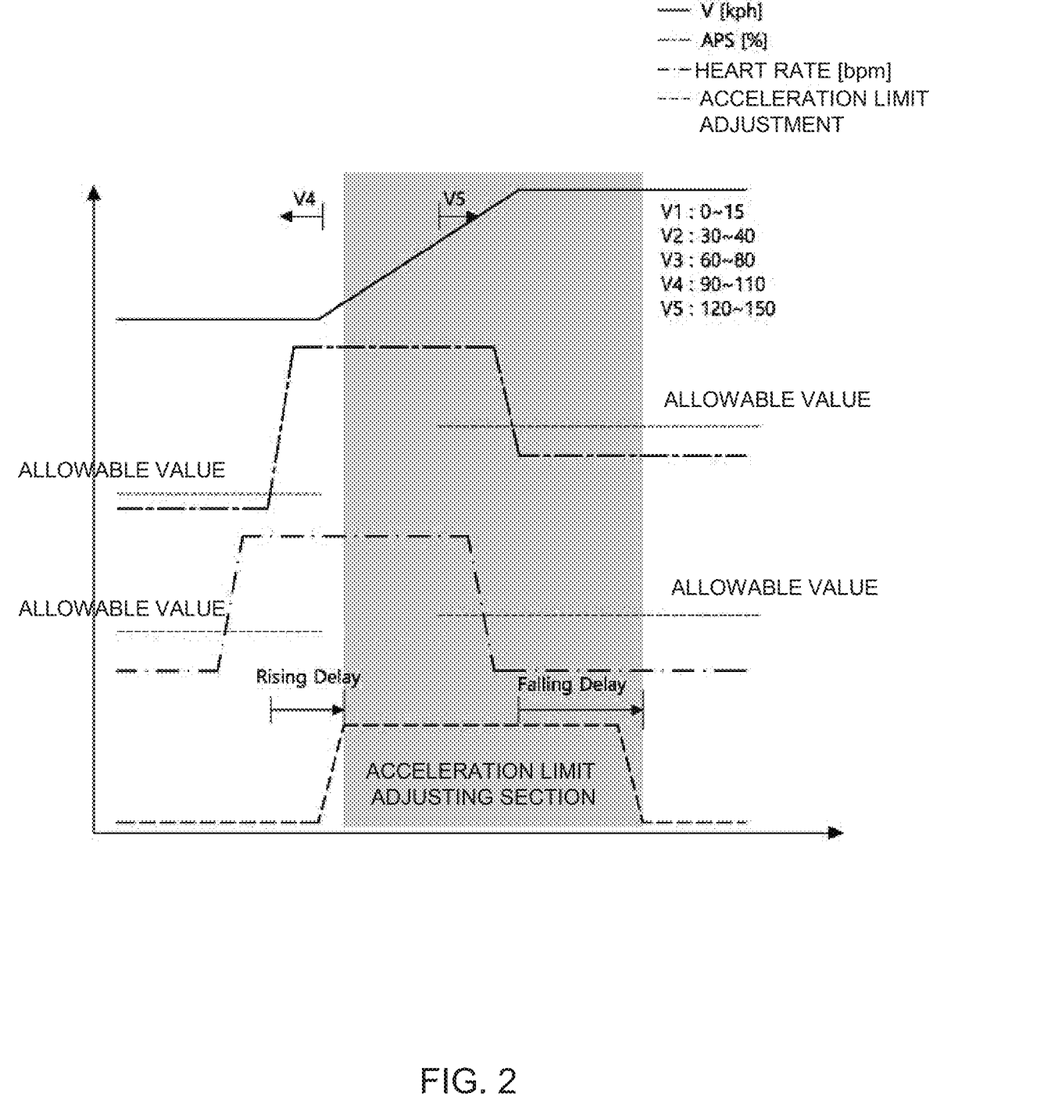
FIG. 2 is a graph showing an example of adjusting an acceleration limit using biometric information of a driver.

FIG. 1 is a diagram showing an acceleration limit control apparatus, and FIG. 2 is a graph showing an example of adjusting an acceleration limit using biometric information of a driver.

Referring to FIG. 1, the acceleration limit control apparatus may include an acceleration limit adjustment unit 100 and a limit acceleration determination unit 200. The acceleration limit adjustment unit 100 may be configured to determine whether to adjust an acceleration limit level on an acceleration limit function that is currently performed (e.g., for each vehicle speed range) using driver information acquired based on biometric information of a driver and to control adjustment of the acceleration limit level. The limit acceleration determination unit 200 may be configured to change acceleration limit of a vehicle that is accelerated based on the degree of accelerator pedal manipulation by the driver and the adjusted acceleration limit level and to output the same to an acceleration limit device 300.

The acceleration limit adjustment unit 100 may include a driver information collection unit 110, an adjustment-activation determination unit 120, and an acceleration limit adjustment unit 130. The driver information collection unit 110 may be configured to receive biometric information of the driver from a biometric sensor (e.g., in order to recognize a physical or emotional change of the driver) and to store the same as individualized driver information of each driver. The adjustment-activation determination unit 120 may be configured to compare the driver information with a threshold range for each vehicle speed range stored in a memory and to determine, when the current driver information exceeds the threshold range, that it is necessary to adjust the acceleration limit level. The acceleration limit adjustment unit 130 may be configured to (e.g., forcibly) adjust the current acceleration limit level if the state in which a value indicating the current driver information exceeds the threshold range remains for a predetermined time or longer.

The driver information collection unit 110 may (e.g., continuously, periodically, etc.) receive biometric information (e.g., a heart rate, a stress index, a brainwave, etc.) of the driver from the biometric sensor and may store the same in the memory. The driver information collection unit 110 may receive biometric information from a separate sensor (e.g., a separate heart rate sensor) provided in the vehicle, and/or may receive biometric information measured by a wearable device of the driver. The information measured by the wearable device may be communicated through a wireless communication network.

The driver information collection unit 110 may receive changes in the degree of accelerator pedal manipulation (which is, for example, sensed by an accelerator position sensor (APS)) and the degree of brake pedal manipulation (which is, for example, sensed by a brake position sensor (BPS)) of the driver and a steering angle (which is, for example, sensed by a steering angle sensor (SAS)) during driving as driving information (e.g., driving tendency information, driving pattern information, etc.) of each driver, and may store the same in the memory.

A determination whether to apply an acceleration limit adjustment, such as lowering or raising the acceleration limit level, may be changed depending on the driving pattern/tendency of each driver even under the same condition, and therefore the driver information collection unit 110 may collect not only the biometric information of the driver but also the driving information of the driver.

The driver information collection unit 110 may set a plurality of vehicle speed ranges having configured ranges, and may store the biometric information and the driving information for each vehicle speed range.

As in an example of the vehicle speed range shown in FIG. 2, the driver information collection unit may divide the vehicle speed range into a first period V1 (e.g., 0 to 15 kilometer per hour (kph) or mile per hour (mph)), a second period V2 (e.g., 30 to 40 kph or mph), a third period V3 (e.g., 60 to 80 kph or mph), a fourth period V4 (e.g., 90 to 110 kph or mph), and a fifth period V5 (e.g., 120 to 150 kph or mph), and may store the biometric information and the driving information of the driver with respect to each vehicle speed range.

The driver information collection unit 110 may perform a training process (e.g., deep learning or any other machine learning processes) based on the biometric information and the driving information of the driver stored for each vehicle speed range.

As shown in FIG. 2, an allowable value indicating a threshold range of the degree of accelerator pedal manipulation (e.g., an APS value) may be differently set in the fourth period V4 and the fifth period V5, respectively. Also, an allowable value indicating a threshold range of the heart rate (indicated by a dotted straight line in FIG. 2) may be differently set in the fourth period V4 and the fifth period V5, respectively.

For example, the driver information collection unit 110 may update the existing driver information by reflecting the difference between a measured value acquired during the recent driving cycle and the existing driver information to create new driver information, as represented by Mathematical Expression 1 below.

New=Old+(Measured value−Old)*Factor  [Mathematical Expression 1]

In Mathematical Expression 1 above, "factor" is provided to determine weight by which a change in the measured value acquired during the recent driving cycle is reflected in the existing driver information. In the vehicle speed range in which driving is frequently performed, the weight may be set to a value larger than a configured value. In the vehicle speed range in which driving is not frequently performed, the weight may be set to a value smaller than the configured value. Various different settings may be possible.

The driver information calculated by the driver information collection unit 110 may be stored in a storage (e.g., a nonvolatile memory) provided in a vehicle control unit. Each driver may be profiled, and the driver information may be stored as individual information of the driver, whereby the acceleration limit control may be provided as an individually customized function.

The driver information collection unit 110 may store biometric information and driving information of the driver acquired during an acceleration limit adjustment of the acceleration limit level according to the driver information as data (e.g., targets) for the learning process associated with the driver information.

Acquisition, storage, and learning of the driver information may be (e.g., continuously or periodically) performed even in the next driving cycle as well as the current driving cycle, as described above, whereby an increase in skill of the driver, a driving tendency change, and a driving environment change may be reflected in the driver information in real time.

For example, a novice driver may have a timid or reckless driving tendency in all vehicle speed ranges and a higher heart rate and/or a higher stress index may be indicated compared to those of other drivers. For novice drivers, the acceleration limit adjustment may be applied to almost all vehicle speed ranges based on the assumption that the driver is not used to driving a vehicle.

A driver who has moved from a suburb area to a downtown area may have an abnormal driving tendency in a medium-to-low speed range, and the heart rate and the stress index of the driver may be higher than his/her usual heart rate and stress index. For the driver, the acceleration limit adjustment may be applied with respect to the medium-to-low speed range in which biometric information of the driver is changed to an abnormal level.

Since whether to apply the acceleration limit adjustment is determined in an individually customized form based on the situation and characteristics of each individual driver, as described above, the acceleration limit control may be provided as an individually customized function.

The adjustment-activation determination unit 120 may compare the current driver information with the driver information learned for each vehicle speed range, and, if the current driver information exceeds the predetermined threshold range, may determine the acceleration limit adjustment for the vehicle speed range.

The adjustment-activation determination unit 120 may determine whether to enable acceleration limit adjustment for each vehicle speed range. If sufficient data to be utilized for the learning process are accumulated for the vehicle speed range in which the driver usually drives the vehicle, it may be possible to more rapidly enable the acceleration limit adjustment in that vehicle speed range.

The adjustment-activation determination unit 120 may determine whether a change in biometric information of the driver exceeding a threshold range occurs during a normal driving situation or a result from a sudden driving event (e.g., caused by an external intervention), and may determine that the acceleration limit adjustment is necessary, for example, if the change in biometric information is caused by the sudden driving event.

The change in biometric information of the driver may result from an external event, which may cause anxiety (e.g., a panic attack) to the driver, and may also occur depending on the health state of the driver.

If the activation of the acceleration limit adjustment is determined based on the change in biometric information of the driver without considering the driving situation, the acceleration limit adjustment may be activated even when the activation is not appropriate, which may provide an unsatisfactory driving experience to the driver.

The adjustment-activation determination unit 120 may determine whether a sudden driving event, such as abrupt brake manipulation by the driver or a rapid decrease in distance between another vehicle and the vehicle of the driver, occurred as well as the change in biometric information of the driver in order to determine whether to activate the acceleration limit adjustment. If the state in which a value associated with the driver information exceeds the threshold range remains for a predetermined time or longer, the acceleration limit adjustment unit 130 may perform an acceleration limit adjustment control to adjust the acceleration limit of the vehicle.

The acceleration limit adjustment unit 130 may transmit a control signal for increasing or decreasing the acceleration limit level on the acceleration limit function (e.g., that may be in an operation state), for example, to the limit acceleration determination unit 200, which may calculate the limit acceleration so as to be reflected in calculating the limit acceleration by the limit acceleration determination unit 200.

The acceleration limit adjustment unit 130 may increase or decrease the acceleration limit level for each vehicle speed range to which the current speed of the vehicle belongs. If the vehicle is driven in a low speed range, decreasing the acceleration limit level may be performed in order to prevent driver's discomfort level from getting worse due to the excessive intervention by the vehicle's acceleration control (e.g., the acceleration of the vehicle not being increased even when the accelerator pedal is depressed by the driver).

If the vehicle is driven in a medium-to-high speed range, however, increasing the acceleration limit level may be performed in order to reduce or prevent risks of dangerous driving, which may be caused by the driver in an abnormal state of mind.

As described above, the acceleration limit function in the state in which adjustment is performed by the acceleration limit adjustment unit 130 may be set such that the acceleration limit function is retained for a predetermined time, is automatically released, and returns to the original acceleration limit level.

A setting may be configured such that the acceleration limit function in an adjusted state while the current driver information acquired by the driver information collection unit 110 exceeds the threshold range is retained, and the acceleration limit function may return to the original acceleration limit level after the current driver information is within the threshold range.

The acceleration limit adjustment unit 100 may include an acceleration limit adjustment notification unit 140 configured to produce a notification indicating whether an adjustment of the acceleration limit level is performed (e.g., in the form of text or voice) using an output device provided in the vehicle such that the driver can recognize whether an adjustment of the acceleration limit level is performed.

The acceleration limit adjustment notification unit 140 may notify the driver that the acceleration limit adjustment is further performed due to a change in biometric information of the driver while the acceleration limit function is being performed. The notification may be output, for example, through a cluster or an audio, video, and navigation (AVN) system.

If there is residual time during which the acceleration limit adjustment is retained, information about the residual time may also be output (e.g., displayed) such that the driver can recognize the point in time at which the acceleration limit level returns to the original state.

The limit acceleration determination unit 200 may include an acceleration intention determination unit 210, a road situation determination unit 220, and an acceleration limit calculation unit 230. The acceleration intention determination unit 210 may be configured to determine driver's intention of acceleration and the degree of acceleration based on the degree of accelerator pedal manipulation. The road situation determination unit 220 may be configured to determine the current vehicle speed range based on the vehicle speed and to determine whether the road on which the vehicle is driven is a road on which acceleration is possible. The acceleration limit calculation unit 230 may be configured to calculate limit acceleration adjusted based on the acceleration limit level set in the acceleration limit function that is currently performed and a control signal for acceleration limit adjustment received from the acceleration limit adjustment unit and to output the same to the acceleration limit device 300.

The limit acceleration determination unit 200 may calculate limit acceleration $a_{limit}$ at which the acceleration of the vehicle is limited to a predetermined acceleration limit level while performing the acceleration limit function, and may provide the same to the acceleration limit device 300.

Upon receiving a control signal for increasing or decreasing the acceleration limit level for each vehicle speed range according to a determination for adjusting the acceleration limit (e.g., determined based on the biometric information of the driver), the limit acceleration determination unit 200 may adjust the limit acceleration for a configured (e.g., predetermined) time or until the biometric information is within the threshold range (e.g., within a range between a lower threshold and an upper threshold) according to the control signal, whereby driving safety may be secured.

An example of adjusting the acceleration limit using the biometric information of the driver will be described with reference to FIG. 2.

In FIG. 2, the first graph shows a change in vehicle speed V, the second graph shows a degree of accelerator pedal manipulation (e.g., an APS value), the third graph shows a heart rate of the driver, and the fourth graph shows whether an acceleration limit adjustment is performed.

Referring to FIG. 2, if the heart rate of the driver exceeds an allowable value (e.g., which may be a threshold value or a predetermined threshold range) during driving of the vehicle in the vehicle speed range V4, the driver depresses the accelerator pedal to increase the vehicle speed, and the vehicle speed may enter into the vehicle speed range V5.

The acceleration limit adjustment unit 100 may configure one or more vehicle speed ranges, for example, based on vehicle speed information, and may compare the biometric information of the driver with an allowable value set associated with a vehicle speed range to enable acceleration limit adjustment. As shown in FIG. 2, the allowable value for the vehicle speed range V4 and the allowable value for the vehicle speed range V5 may be set to be different from each other.

Figure 4:
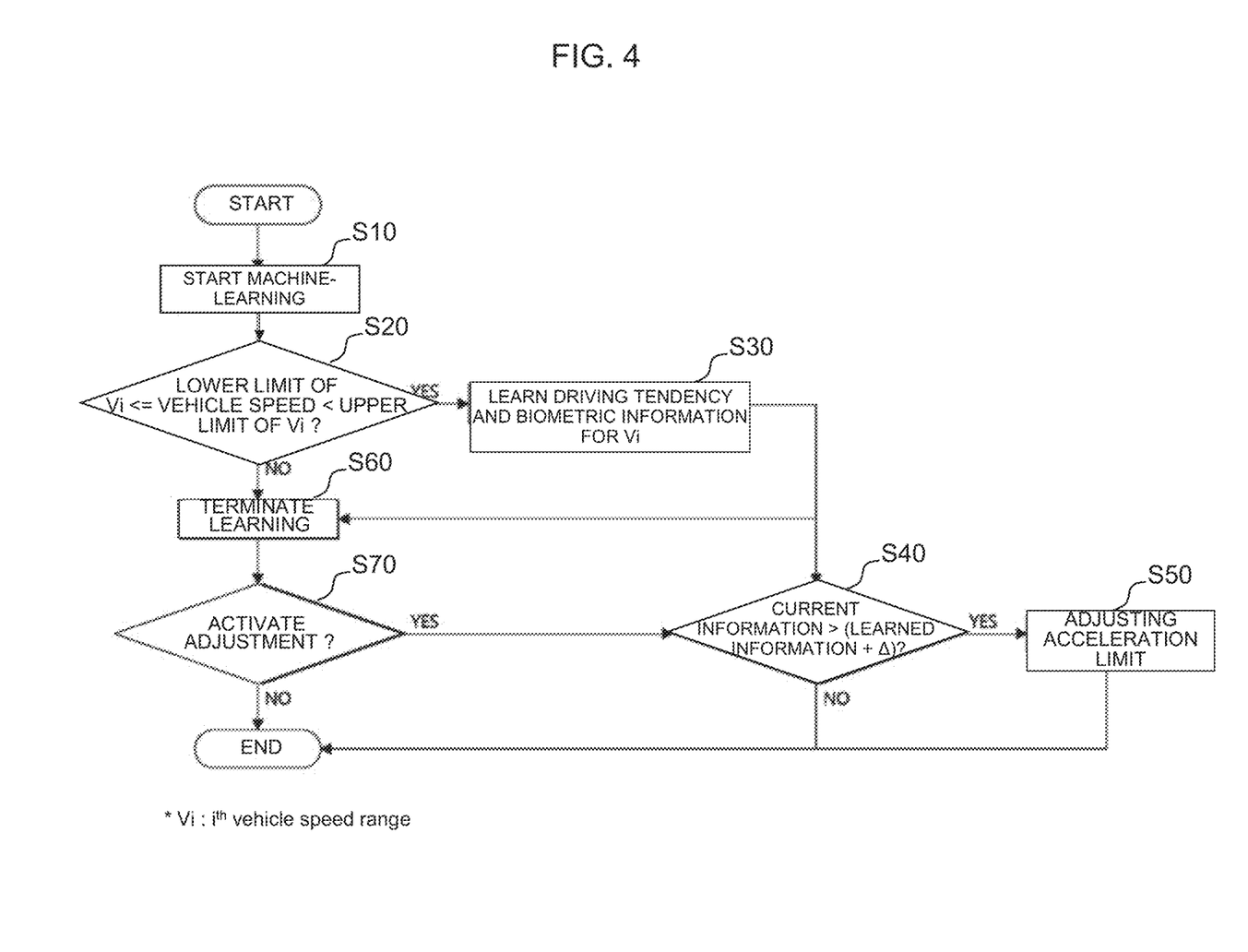
FIG. 4 is a flowchart showing a mechanism of adjusting an acceleration limit based on biometric information or driving pattern/tendency of a driver.

The heart rate of the driver may exceed the allowable value in the vehicle speed range V4 (e.g., as shown in FIG. 4), and the degree of accelerator pedal manipulation (e.g., an APS value) may be increased after a predetermined time, whereby the degree of accelerator pedal manipulation exceeds the allowable value.

If the heart rate of the driver and the degree of accelerator pedal manipulation exceed the respective allowable values (e.g., the respective threshold values), the acceleration limit control may be activated. For example, as described above, the acceleration limit adjustment unit may determine whether to perform the acceleration limit adjustment, create a control signal for adjusting the acceleration limit, and transmit the control signal to the limit acceleration determination unit 200 such that the limit acceleration is adjusted.

This process may be performed during a rising delay shown in FIG. 2 including the graph showing the acceleration limit adjusting section, and the acceleration of the vehicle may be controlled based on the adjusted limit acceleration. The rising delay may be a time delay between a time point at which the APS value starts to increase (e.g., rapidly) and a time point at which the acceleration limit adjustment is activated.

After the state in which the acceleration limit adjustment is applied for a time duration (e.g., a predetermined time duration) may be retained. Alternatively or additionally, after the biometric information (e.g., the heart rate) of the driver and the degree of the accelerator pedal depression (e.g., an APS value) are reduced to the respective allowable values or less, the acceleration limit adjustment may be disabled.

The acceleration limit adjustment may be effective for a time duration (e.g., a falling delay shown in FIG. 2), for example, after the biometric information of the driver and the degree of the accelerator pedal depression are reduced to the respective allowable values or less. The falling delay may be a time delay between a time point at which the APS value starts to decrease (e.g., rapidly) and a time point at which the acceleration limit adjustment is deactivated. In another example, the falling delay may be a time delay between a time point at which the decreasing rate of the APS value starts to fade and a time point at which the acceleration limit adjustment is deactivated.

An acceleration limit control method will be described with reference to FIGS. 3 and 4.

Figure 3:
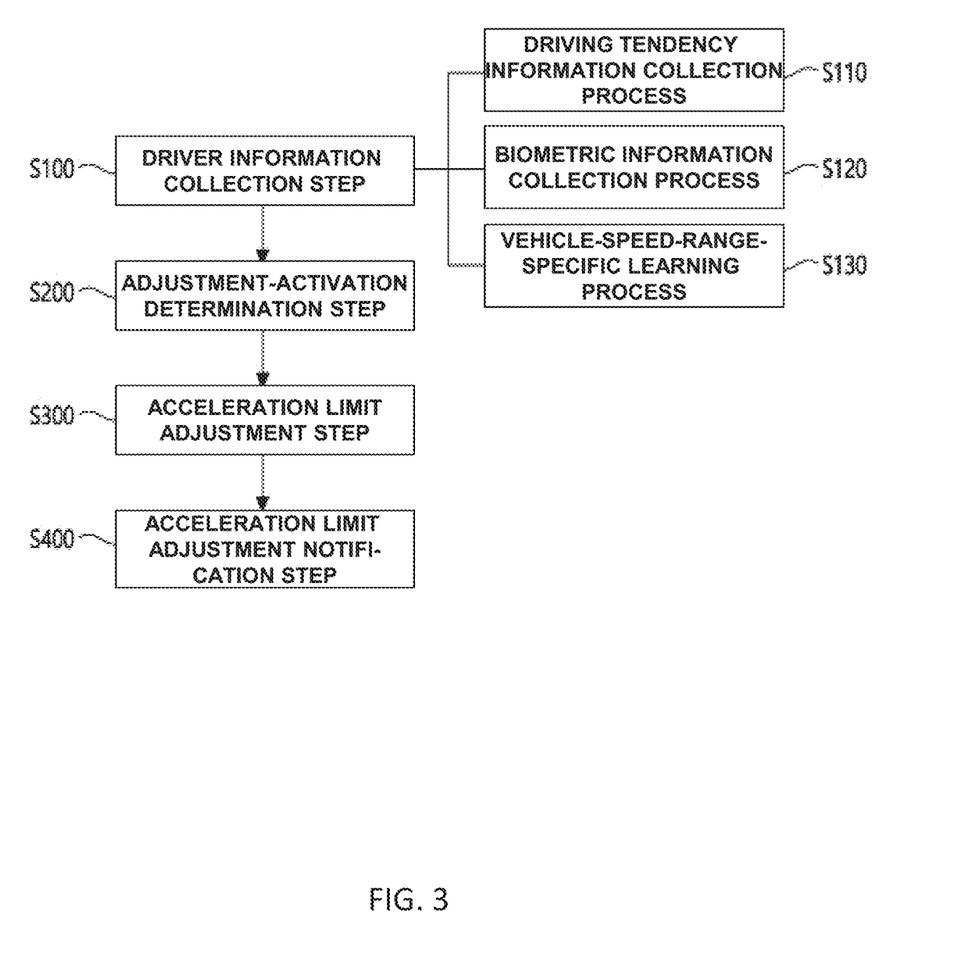
FIG. 3 is a flowchart showing an acceleration limit control method.

Referring to FIGS. 3 and 4, the acceleration limit control method may include a plurality of operations and/or steps. At least some of the operations and/or steps may be optional or may be omitted. For example, a driver information collection step (S100) may include storing current driver information recognized based on biometric information of a driver acquired from a biometric sensor. An adjustment-activation determination step (S200) may include comparing the current driver information with a threshold range of driver information for each vehicle speed range stored in a memory and, if the current driver information exceeds the threshold range, determining that it is necessary to adjust an acceleration limit level. An acceleration limit adjustment step (S300) may include adjusting the current acceleration limit level if the state in which the current driver information exceeds the threshold range remains for a predetermined time or longer.

The driver information collection step (S100) may include one or more processes. For example, a driving tendency information collection process (S110) may include storing changes in the degree of accelerator pedal manipulation (e.g., an APS value), the degree of brake pedal manipulation (BPM) of the driver and a steering angle received from one or more sensors (e.g., APS, BPS, SAS, respectively) provided in a vehicle during driving of the vehicle as driving tendency information with respect to each vehicle speed range. For example, a biometric information collection process (S120) may include storing a heart rate and a stress index of the driver received from a biometric sensor as biometric information with respect to each vehicle speed range. For example, a vehicle-speed-range-specific learning process (S130) may include determining and storing a threshold range indicating driver information when the biometric information is in a normal state using the biometric information and the driving tendency information of the driver stored for each vehicle speed range.

In the driver information collection step (S100), the vehicle speed range may be divided into a plurality of periods having (e.g., arbitrary or configured) vehicle speed ranges, and the biometric information and the driving tendency information of the driver may be cumulatively stored for each vehicle speed range.

In the driver information collection step (S100), biometric information and driving tendency information of the driver acquired during acceleration limit adjustment may also be stored as data (e.g., targets) for learning the driver information.

The vehicle speed range may be divided into a low speed range (e.g., 0 to 15 kph or mph), a medium low speed range (e.g., 30 to 40 kph or mph), a medium speed range (e.g., 60 to 80 kph or mph), a medium-high speed range (e.g., 90 to 110 kph or mph), and a high speed range (e.g., 120 to 150 kph or mph), and the biometric information and the driving tendency information of the driver may be stored for each vehicle speed range.

In the vehicle-speed-range-specific learning process (S130), the existing driver information may be updated by reflecting the difference between a measured value acquired during the recent driving cycle and the existing driver information to create new driver information.

In the adjustment-activation determination step (S200), a determination may be made whether the current driver information exceeds the threshold range for each vehicle speed range, and if the current driver information exceeds the predetermined threshold range, acceleration limit adjustment may be enabled/activated.

In the adjustment-activation determination step (S200), a determination may be made whether a change in biometric information of the driver exceeding the threshold range occurs during a normal driving situation or may be a result from a sudden driving event caused by an external intervention, and a determination may be made that the acceleration limit adjustment is necessary, for example, if the change is a result from a sudden driving event.

In the adjustment-activation determination step (S200), a determination may be made whether a sudden driving event, such as abrupt brake manipulation by the driver due to abrupt lane change of an external vehicle or a rapid decrease in distance from a preceding vehicle, occurred as well as the change in biometric information of the driver in order to determine whether an acceleration limit adjustment is proper.

In the acceleration limit adjustment step (S300), a control signal for increasing or decreasing the acceleration limit level on the acceleration limit function that is already under operation may be transmitted to the limit acceleration determination unit that calculates the limit acceleration so as to be reflected in calculating the limit acceleration.

In the acceleration limit adjustment step (S300), the acceleration limit level may be increased or decreased with respect to each vehicle speed range to which the current speed of the vehicle belongs. For example, if the vehicle is driven in a low speed range, an adjustment to decrease the acceleration limit level in order to increase the acceleration limit may be performed in order to avoid any excessive intervention and/or inconvenience to the driver.

If the vehicle is driven in a medium-high speed range, however, an adjustment to increase the acceleration limit level in order to adjust the acceleration limit may be performed in order to prevent dangerous driving by the driver.

The acceleration limit adjusted by the vehicle in the acceleration limit adjustment step (S300) may be retained for a predetermined time, may be automatically released, and may return to the original acceleration limit level after the predetermined time.

The acceleration limit control method may include an acceleration limit adjustment notification step (S400) of producing a notification indicating whether an acceleration limit adjustment is started, performed, and/or completed, for example, in the form of text or voice using an output device provided in the vehicle (e.g., a cluster or an AVN system) such that the driver can recognize whether the acceleration limit adjustment is started, performed, and/or completed.

As described above, it may be possible to determine whether to decrease or increase the acceleration limit level on the acceleration limit function that is already under operation, for example, using the biometric information (e.g., the heart rate, the stress index, etc.) of the driver. It may also be possible to perform an acceleration limit control corresponding to the road driving situation and the mental state of the driver.

Since the acceleration limit is decreased or increased depending on the mental state of the driver, it may be possible to prevent the driver from recklessly rushing into dangerous driving, and it may be possible to secure safety of the driver and the passenger.

FIG. 4 is a flowchart showing a mechanism of adjusting an acceleration limit based on biometric information or driving pattern/tendency of a driver.

Referring to FIG. 4, the vehicle may perform a machine learning process with driving tendency information and biometric information obtained (or accumulated) while driving.

For example, once the driving tendency information and the biometric information is obtained, the vehicle may start the machine learning process (e.g., in step S10).

The machine learning process may include determining the current vehicle speed range to which a current vehicle speed belongs (e.g., in step S20), and performing the learning process for the vehicle speed range (e.g., in step S30). Through the learning process, the vehicle may determine the threshold as described above for each vehicle speed range.

Once the corresponding threshold value is determined for any one of the plurality of vehicle speed ranges, the acceleration limit function may be activated (e.g., in step S70).

For example, if a value of current driver information is greater than a learned information value (e.g., the corresponding threshold value) by a predetermined value A (YES in step S40), the vehicle may perform adjusting a corresponding acceleration limit preset for the vehicle speed range (e.g., in step S50).

One or more features described herein may be implemented as a computer-readable program and/or instructions stored in a computer-readable recording medium. The computer-readable medium may be any type of recording device in which data is stored in a computer-readable manner. The computer-readable medium may include, for example, a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, and an optical data storage device. The programs and/or instructions, when executed by one or more processors, may cause a device to perform one or more operations and/or steps described herein.

As is apparent from the above description, one or more implementations described herein may provide an effect in that it is possible to determine whether to decrease or increase an acceleration limit level with respect to each vehicle speed range using biometric information (e.g., a heart rate, a stress index, etc.) of a driver, and to adjust the acceleration limit level, and/or it is possible to perform an acceleration limit control corresponding to a road driving situation and a psychological/mental state of the driver.

Effects obtainable from the aspects of the present disclosure are not limited by the above mentioned effects, and other unmentioned effects can be understood from the above description by those having ordinary skill in the same or similar technical fields.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

What is claimed is:

1. An apparatus comprising:
   at least one processor; and
   memory storing instructions that, when executed by the at least one processor, cause the apparatus to:
   set a plurality of vehicle speed ranges;
   receive, from a biometric sensor as biometric information of a driver of a vehicle, a heart rate of the driver and a stress index of the driver;
   determine, based on the biometric information, whether to adjust an acceleration limit level, which is associated with an acceleration limit control operation of the vehicle, for each of the plurality of vehicle speed ranges;
   adjust the acceleration limit level by increasing or decreasing the acceleration limit level; and
   control, based on a degree of an accelerator pedal manipulation and the adjusted acceleration limit level, an acceleration of the vehicle.

2. The apparatus according to claim 1, wherein the instructions, when executed by the at least one processor, cause the apparatus to determine whether to adjust the acceleration limit level by:
   determining, based on the biometric information, driver information of the driver;
   comparing a value associated with the driver information with a threshold value for a corresponding vehicle speed range; and
   determining, based on the value associated with the driver information exceeding the threshold value, to adjust the acceleration limit level; and
   wherein the instructions, when executed by the at least one processor, cause the apparatus to adjust the acceleration limit level based on the value associated with the driver information exceeding the threshold value at least for a time duration.

3. The apparatus according to claim 2, wherein the instructions, when executed by the at least one processor, cause the apparatus to:
   update the driver information based on a difference between a measured value acquired while the vehicle is moving and a previously measured value of the driver information.

4. The apparatus according to claim 2, wherein the instructions, when executed by the at least one processor, cause the apparatus to:
   control the acceleration of the vehicle further based on the value associated with the driver information exceeding the threshold value; and
   readjust, based on the value associated with the driver information not exceeding the threshold value, the adjusted acceleration limit level to a previous acceleration limit level.

5. The apparatus according to claim 1, wherein the instructions, when executed by the at least one processor, cause the apparatus to:
   receive, from one or more sensors associated with the vehicle, information indicating changes in the degree of the accelerator pedal manipulation, a degree of a brake pedal manipulation, and a steering angle; and
   determine, based on the information indicating changes in the degree of the accelerator pedal manipulation, the degree of the brake pedal manipulation, and the steering angle, driving tendency information of the driver.

6. The apparatus according to claim 5, wherein the instructions, when executed by the at least one processor, cause the apparatus to:
   store, for a corresponding vehicle speed range, the biometric information and the driving tendency information; and
   set a threshold value for each of the plurality of vehicle speed ranges.

7. The apparatus according to claim 1, wherein the instructions, when executed by the at least one processor, cause the apparatus to determine whether to adjust the acceleration limit level further based on:
   a change in the biometric information of the driver that exceeds a threshold value; and
   a driving event caused by an external intervention.

8. The apparatus according to claim 1, wherein the instructions, when executed by the at least one processor, cause the apparatus to generate a control signal for increasing or decreasing the acceleration limit level.

9. The apparatus according to claim 1, wherein the instructions, when executed by the at least one processor, cause the apparatus to:
   maintain the adjusted acceleration limit level for a time duration; and
   after maintaining the adjusted acceleration limit level, readjust the adjusted acceleration limit level to a previous acceleration limit level.

10. The apparatus according to claim 1, wherein the instructions, when executed by the at least one processor, cause the apparatus to output, using an output device of the vehicle, a notification indicating that the acceleration limit level has been adjusted.

11. A method comprising:
    setting, by an apparatus of a vehicle, a plurality of vehicle speed ranges;
    storing a threshold value, associated with driver information, for each of the plurality of vehicle speed ranges;
    storing, by the apparatus of the vehicle, the driver information, wherein the driver information is recognized based on biometric information, of a driver of the vehicle, acquired from a biometric sensor;
    comparing a value associated with the driver information with the threshold value associated with the driver information for a corresponding vehicle speed range;
    adjusting, based on the value associated with the driver information exceeding the threshold value for a time duration, an acceleration limit level; and
    controlling, based on the adjusted acceleration limit level, an acceleration of the vehicle.

12. The method according to claim 11, further comprising:
    storing, as driving tendency information for the corresponding vehicle speed range, information indicating changes in a degree of an accelerator pedal manipulation by the driver, a degree of a brake pedal manipulation by the driver, and a steering angle, wherein the information indicating the changes is received from one or more sensors associated with the vehicle;

storing, as biometric information for the corresponding vehicle speed range, a heart rate of the driver and a stress index of the driver that are received from the biometric sensor; and setting, using the biometric information for the corresponding vehicle speed range and the driving tendency information for the corresponding vehicle speed range, one or more threshold values for the corresponding vehicle speed range.

13. The method according to claim 11, further comprising updating the driver information based on a difference between a measured value acquired while the vehicle is moving and a previously measured value of the driver information.

14. The method according to claim 11, further comprising determining whether to adjust the acceleration limit level based on:

a change in the biometric information; and a driving event caused by an external intervention.

15. The method according to claim 11, further comprising generating a control signal for increasing or decreasing the acceleration limit level; and transmitting the control signal for calculating a limit acceleration.

16. The method according to claim 15, further comprising:

maintaining the adjusted acceleration limit level for a second time duration; and after maintaining the adjusted acceleration limit level, readjusting the adjusted acceleration limit level to a previous acceleration limit level.

17. The method according to claim 11, further comprising outputting, using an output device of the vehicle, a notification indicating that the acceleration limit level has been adjusted.

* * * * *